United States Patent
Resenius et al.

(10) Patent No.: US 6,757,734 B1
(45) Date of Patent: Jun. 29, 2004

(54) METHOD OF COMMUNICATION

(75) Inventors: Lars Erik Resenius, Sköndal (SE); Mats Jörgen Persson, Ingarö (SE); Nils Torbjörn Alexander Hovmark, Vallentuna (SE); Lars Erik Mauritz Laven, Täby (SE)

(73) Assignee: Columbitech AB, Stockholm (SE)

( * ) Notice: Subject to any disclaimer, the term of this patent is extended or adjusted under 35 U.S.C. 154(b) by 718 days.

(21) Appl. No.: 09/722,009

(22) Filed: Nov. 27, 2000

(30) Foreign Application Priority Data

Jun. 21, 2000 (SE) .............................................. 0002328

(51) Int. Cl.7 .............................................. G06F 15/16
(52) U.S. Cl. ...................................... 709/230; 370/466
(58) Field of Search ................................ 709/200, 201, 709/203, 217, 218, 219, 220, 221, 224, 227, 230; 370/466, 467, 469

(56) References Cited

U.S. PATENT DOCUMENTS

| | | | |
|---|---|---|---|
| 5,537,417 A | 7/1996 | Sharma et al. | 370/94.1 |
| 5,710,908 A | 1/1998 | Man | 395/500 |
| 6,356,529 B1 * | 3/2002 | Zarom | 370/231 |
| 6,490,291 B1 * | 12/2002 | Lee et al. | 370/401 |
| 6,549,776 B1 * | 4/2003 | Joong | 455/433 |
| 6,606,663 B1 * | 8/2003 | Liao et al. | 709/229 |
| 6,609,150 B2 * | 8/2003 | Lee et al. | 709/219 |

FOREIGN PATENT DOCUMENTS

| | | |
|---|---|---|
| EP | 0 942 554 A2 | 9/1999 |
| WO | WO/99/21102 | 4/1999 |
| WO | WO 99/26122 | 5/1999 |

OTHER PUBLICATIONS

"Tool Helps Microsoft Servers Handle WAP"; Sheila McDonald, ElectricNews.net, May 23, 2000.

* cited by examiner

*Primary Examiner*—Moustafa M. Meky
(74) *Attorney, Agent, or Firm*—Nixon & Vanderhye, P.C.; Richard G. Besha

(57) ABSTRACT

The present invention relates to a method of achieving communication via a network with the aid of a wireless application protocol (WAP) between a first application (A1) in a first computer unit (A) and a second application in a second computer unit, wherein said first application (A1) is a Windows® application. The first computer unit (A) includes a WinSock TCP base provider (2) operating beneath WinSock SPI (3), and a TCP/UDP/IP stack (4) operating beneath said WinSock TCP base provider (2). The first application (A1) includes a function for communicating by means of TCP/IP via the TCP/UDP/IP stack (4) and the WinSock TCP base provider (2). The first computer unit (A) also includes a module (5) and a WAP stack (6). The module (5) includes the function of forming an interface between said WAP stack (6) and the first application (A1).

29 Claims, 5 Drawing Sheets

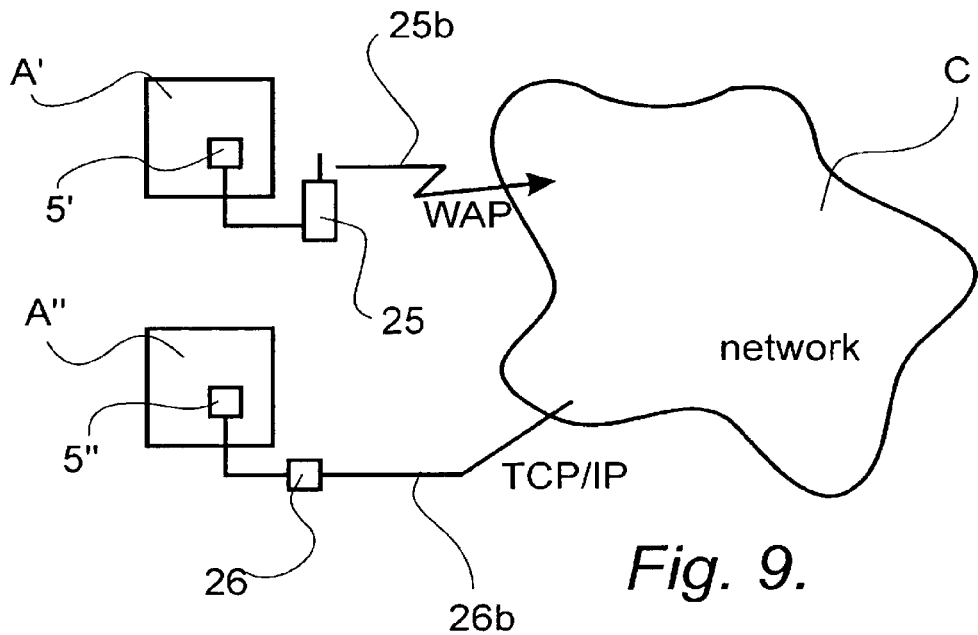
*Fig. 9.*
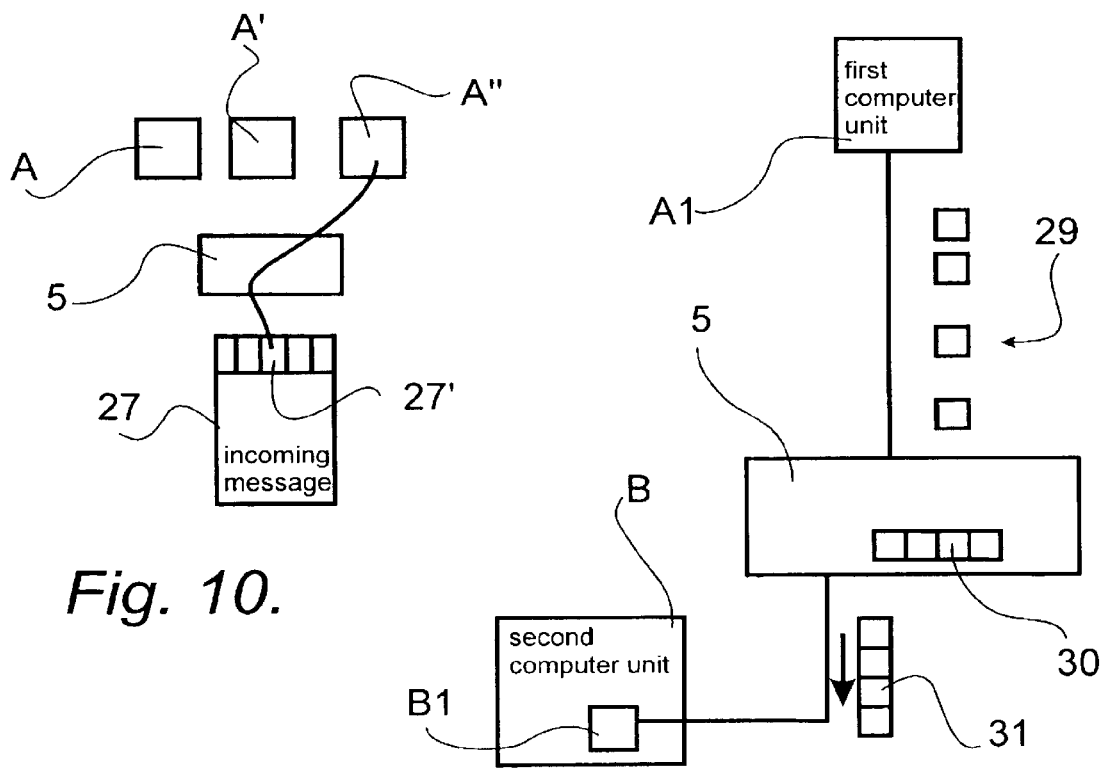
*Fig. 10.*
*Fig. 11.*

METHOD OF COMMUNICATION

TECHNICAL FIELD

The present invention relates to a method of achieving communication by means of the wireless application protocol, WAP, between a first application in a first computer unit and a second application in a second computer unit, where the first application is a Windows® application.

The first computer unit includes a WinSock TCP base provider operating beneath Winsock SPI and a TCP/UDP/IP stack operating beneath the WinSock TCP base provider.

The first application includes the functionality of communicating by means of TCP/IP via the TCP/UDP/IP stack and the WinSock TCP base provider.

The present invention also relates to a computer program product that includes a program code, and a computer readable medium carrying a computer program code, which code, when executed by a computer unit, carries out functions possessed by a module in accordance with the inventive method.

DESCRIPTION OF THE BACKGROUND ART

For the sake of simplicity, a number of acronyms have been used in this description and in the accompanying Claims. Although these acronyms are well known to the person skilled in this art, the main parts of the compound terms will be explained for the sake of clarity.

WAP—Wireless Application Protocol, TCP—Transmission Check Protocol, UDP—User Datagram Protocol, IP—Internet Protocol, TDI—Transport Driver Interface, SPI—Service Provider Interface, LSP—Layered Service Provider, SOAP—Simple Object Access Protocol, POP3—Post Office Protocol version 3, IMAP4—Internet Message Access Protocol version 4, SMTP—Simple Mail Transfer Protocol, WSP Wireless Session Protocol, URI—Universal Resource Identifier, IIS—Internet Information Server.

It has long been known to use different protocols when communicating between two or more computer units. These protocols check how information shall be packed when transmitting information, how said information shall be forwarded during transport between the computer units, and how the information received shall be interpreted.

When an application in a computer unit shall communicate via a network, contact is established between the application and the hardware that connects the computer unit to the network via special modules or software products. The operating system Windows® includes a so-called WinSock API, thereby enabling a number of sockets or connections to be established in respect of such communication. WinSock API is comprised of an interface that includes a set of defined functions that enable such sockets to be formed.

These sockets can be adapted to operate in accordance with different protocols and beneath the WinSock layer there is found a so-called SPI which operates against a number of base providers (also called base protocols and base transport service providers) and layered service providers (also called layered protocols and layered transport service providers) which are adapted to receive or send information via specific protocol stacks. Different Windows® applications are adapted to communicate via specific protocols. The base providers normally used for communication over the global network Internet, and also within local networks such as an ethernet, include the so-called WinSock TCP base provider and WinSock UDP base provider.

A base provider operates against a so-called stack via an interface designated TDI. The stack constitutes the software that operates nearest the hard connection between the computer unit and the network, in other words the network interface card. Outgoing information is packed in the stack in the format that the information shall have when it is sent over the network, whereas incoming information is unpacked in a manner which enables it to be used by the computer unit. The stack used traditionally for communication over the Internet is called the TCP/UDP/IP stack and sometimes only the TCP/IP stack or the IP stack.

Because of the progressive increase in the use of wireless mobile telephones, it is desirable that communication between a computer unit and a mobile telephone can be established for the transmission of information. WAP is a protocol that has been created to enable such communication to be achieved efficiently, despite the low bandwidth that is often available for mobile telephones.

The various Windows® applications, base providers and stacks required for such communication are not adapted for WAP communication. For instance, a Windows® application, such as an IIS or a browser in a personal computer cannot communicate directly in accordance with WAP.

It is also known to establish gateways that can translate between WAP and a more readily handled protocol, such as HTTP. These gateways, for instance, may interpret information according to WAP and repack the information according to HTTP. This enables a WAP application to communicate with, e.g., a Windows® application.

However, the constant need to communicate via a gateway that has such a function has a limiting effect. Neither is security satisfactory in the case of such communications. When encryption is used, it is necessary for the gateway to decrypt the message and repack in order to again encrypt the message. This means that decrypted, sensitive information, is available on this gateway, which is unacceptable in many instances.

The necessity of acquiring, configuring and administering a separate WAP gateway is also troublesome in many practical applications.

It is also known that WAP servers that include server programs especially written for communication in accordance with WAP can be constructed. One example in this respect is the Nokia WAP Server.

Although such WAP servers can solve the security problems associated with gateways, they have the limitation that all information must be stored directly in the WAP server and not in the web server that would otherwise have been used.

In conjunction with the present invention, it will also be mentioned that it is known to use a so-called WinSock LSP to check an established socket. An LSP is placed between the WinSock SPI and the base provider and can be allotted different functions depending on what is desired. Such functions may be to reserve a given bandwidth for an established socket or to encrypt and decrypt information transmitted via a socket.

SUMMARY OF THE PRESENT INVENTION

Technical Problems

When considering the present standpoint of techniques as described above, and with a starting point from a method according to the aforesaid technical field, it will be seen that a technical problem exists in establishing communication between a WAP application and a Windows® application when the Windows® application is not adapted for communication with a WAP application.

Another technical problem is one of providing communication where unpacking and possible decryption do not take place on an intermediate gateway.

Another technical problem resides in providing communication that is not restricted by the access to gateways in the communications path that can interpret between WAP and, e.g., HTTP.

Another technical problem is one of providing so-called end-to-end security via WAP with encrypted communication that can only be unpacked by the receiver and where both the WAP application and the Windows® application are able to authenticate each other.

With respect to a Windows® application that is adapted to communicate via a known protocol, such as HTTP, POP3, IMAP4 or SMTP, a technical problem resides in communicating via the more effective WAP protocol instead, and therewith save bandwidth.

Another technical problem is one of translating between a WAP protocol and one or more protocols belonging to one or more different Windows® applications without the assistance of WAP gateways or proxies.

In conjunction with such a method, a technical problem resides in enabling authentication to be achieved efficiently and safely through the medium of the user name and password.

Another technical problem resides in achieving communication via WAP in respect of certain applications, without preventing other applications from communicating via TCP in a normal manner.

In respect of a computer unit that is connected on some occasions to a network via a first device having a first bandwidth, such as via a GSM telephone, and on other occasions is connected to the network via a second device having a second bandwidth, such as via a modem and a fixed telephone line, where the first bandwidth is lower than the second bandwidth, a technical problem exists in enabling the connection at the lower bandwidth to be effected in accordance with WAP and enabling the connection at the higher bandwidth to be effected in accordance with TCP/IP.

Another technical problem is one enabling several Windows® applications that are server applications on one and the same computer unit to communicate simultaneously in accordance with WAP.

Another technical problem is one of managing the difference whereby a protocol above TCP/IP operates with a partial response, whereas WAP requires a complete response.

Solution

With the intention of providing a solution to one or more of the aforesaid problems, the present invention takes as its starting point a method for receiving, via a network, a communication between a first application in a first computer unit and a second application in a second computer unit with the aid of the WAP protocol, where the first application is a Windows® application.

The first computer unit includes a WinSock TCP base provider operating beneath WinSock SPI, and a TCP/UDP/IP stack operating beneath the WinSock TCP base provider.

The first application also includes the functionality of communicating by means of TCP/IP via the TCP/UDP/IP stack and the WinSock TCP base provider.

Taking its starting point from such a method, it is proposed in accordance with the present invention that the first computer includes a module and a WAP stack, said module being allocated the function of forming an interface between the WAP stack and the first application.

It is also proposed in accordance with the present invention that the module operates between WinSock SPI and the WinSock TCP base provider.

According to a preferred embodiment of the invention, the first computer unit may include a WinSock UDP base provider that operates beneath WinSock SPI and parallel with the WinSock TCP base provider, where the TCP/UDP/IP stack also operates beneath the WinSock UDP base provider. It is also proposed in accordance with the invention that the WAP stack operates between the module and the WinSock UDP base provider.

In this case, a connection can be established between the first and the second application via the TCP/UDP/IP stack, the WinSock UDP base provider, the WAP stack, and said module.

According to another preferred embodiment of the invention, it is proposed that the first computer unit includes a WinSock base provider for WAP, operating beneath the module parallel with the WinSock TCP base provider, and that the WAP stack works beneath the WinSock base provider for WAP parallel with the TCP/UDP/IP stack.

In this case, a connection can be established between the first and the second application via the WAP stack, the WinSock base provider for WAP and said module.

The inventive unit has three general tasks; it shall translate between a WAP protocol and one or more protocols belonging to one or more different first applications; it shall map incoming or outgoing WAP requests or WAP sessions to TCP sockets, and it shall be transparent to applications that do not communicate in accordance with WAP.

The translating function is carried out in different ways, depending on how the first application works. When the first application works in accordance with HTTP, the module translates between WAP and HTTP in accordance with prescribed standard specifications.

This means that the first application can also work in accordance with SOAP. When the first application works in accordance with an e-mail protocol, such as POP3, IMAP4 or SMTP, it is proposed in accordance with the invention that the module will effect mapping of each command and response on one or more of the fields in a WSP message.

With the intention of enabling messages to be handled where the first application requires authentication through the medium of a user name and password, it is proposed in accordance with the present invention that the module respectively reads and writes the user name and password from and into the header field of the messages concerned in accordance with WSP.

The present invention provides a number of different possible embodiments so as to enable a decision to be made as to whether the socket shall communicate according to WAP or according to TCP/IP.

According to one possible embodiment of the present invention, a first socket is established against one or more first ports in the second computer unit, a second socket is established against one or more second ports that are separate from the first ports and belong to the second computer unit, and that said module communicates according to WAP or according to TCP/IP on the basis of the port used.

According to a further possible embodiment of the invention, the first or the second computer unit is allocated a number of different IP addresses, of which one or more is chosen to receive WAP requests or sessions, and said module communicates in accordance with WAP or in accordance with TCP/IP on the basis of the IP address used.

The present invention also includes a further possible embodiment, in which the first computer unit is sometimes connected to the network via a first device having a first bandwidth, such as via a GSM telephone, and in other instances is connected to the network via a second device having a second bandwidth, such as via a modem and a fixed telephone line, where said bandwidth is lower than the second bandwidth. According to this embodiment, said module reads the available bandwidth and communication in accordance with WAP is used when the available bandwidth is equal to or lower than the first bandwidth, whereas communication in accordance with TCP/IP is used when the available bandwidth is higher than the first bandwidth.

According to the invention, said module also performs a check in which it is able to decide to which first application an incoming WAP request or session belongs.

This check can comprise the detection of a predetermined field in a header belonging to an incoming message.

When the WAP stack is used on a plurality of ports, the ports can be used to carry out the check.

When an application is addressed through an URI, it is proposed in accordance with the present invention that the first application to which a given incoming request or session belongs is identified by identifying a unique field of a URI belonging to the request or session, such as the protocol-identifying field, the host-identifying field, the port-identifying field, the path-identifying field, and/or a parameter field.

The check may also comprise the detection of a predetermined WSP method that is used by said request or session and that is unique to the first application that uses the WSP method.

The first applications may also be identified through the medium of the TCP port or ports on which they listen.

With the intention of handling the fact that a WAP application requires a complete response whereas the TCP socket delivers only a partial-response, it is proposed in accordance with the invention that when the first application uses a TCP socket, said module stores the partial-responses from the first application until a response is complete, and then sends this complete response to the second application.

According to the present invention, said module shall be designed to constitute a WinSock LSP.

An inventive module can be used in different contexts. Firstly, it may be of interest to use said module when the second computer unit is comprised of a computer unit adapted for communication by means of WAP, such as a WAP telephone, or a computer unit connected to the network via a wireless telephone.

Secondly, it may be of interest to use the module when the second application is comprised of a WAP gateway or a WAP server.

The present invention may also be of interest when the second computer unit is comprised of a computer unit having the same properties as the first computer unit and where the second application is comprised of a Windows® application. This situation allows the first computer unit to communicate with the second computer unit by means of WAP when both computer units are equipped with a module in accordance with the invention.

The network used may be the global network Internet.

The present invention also relates to a computer program product and to a computer readable medium. The computer program product includes computer program code which, when executed by a computer unit, carries out the functions possessed by a module, a WAP stack and, when appropriate, a WinSock base provider for WAP in accordance with the present invention.

Stored on the computer readable medium is computer program code which when executed by a computer unit carries out the functions possessed by a module, a WAP stack and, when appropriate, a WinSock base provider for WAP, in accordance with the present invention.

Advantages

Those advantages that can be primarily associated with a method or a computer program product according to the present invention reside in the ability to establish communication between a WAP application and a Windows® application, where unpacking and possible decryption are not performed on any intermediate gateway. The present invention thus affords communication that is not restricted by the availability in the communications path of gateways that can interpret between WAP and, e.g., HTTP.

The invention also affords the possibility of end-to-end security with an encrypted communication that can only be unpacked by the receiver and where both the WAP application and the Windows® application can authenticate each other.

Another advantage afforded by the invention is that it enables Windows® applications that communicate via a known protocol, such as HTTP, to communicate instead via the more effective WAP protocol and therewith save bandwidth.

BRIEF DESCRIPTION OF THE DRAWINGS

The present invention will now be described in more detail with reference to the accompanying drawings, in which

FIG. 9 illustrates schematically different ways of coupling a computer unit to a network;

FIG. 10 illustrates schematically that a WAP request or session can be coupled to a specific first application by detecting a field belonging to the request or the session;

FIG. 11 illustrates schematically handling of partial-responses from a TCP/IP socket to a WAP application;

DESCRIPTION OF EMBODIMENTS AT PRESENT PREFERRED

Figure 1:
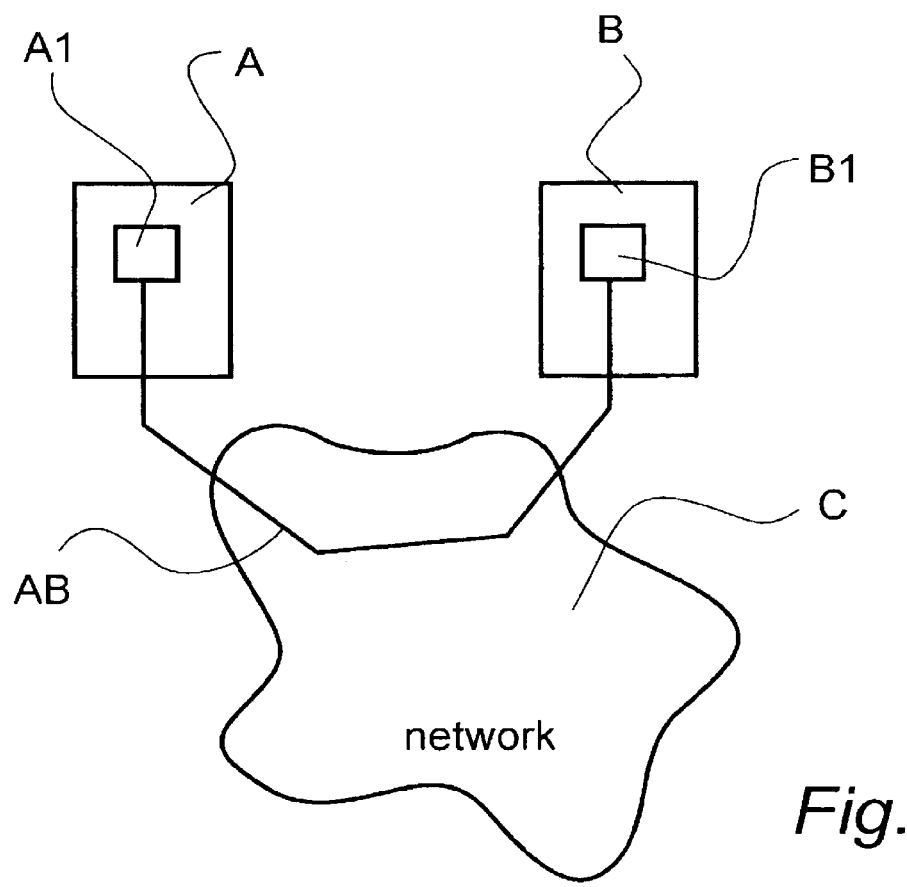
FIG. 1 is a schematic and highly simplified view of a network that includes a first and a second computer unit.

FIG. 1 thus illustrates a method of establishing communication AB via a network C by means of the WAP protocol between a first application A1 in a first computer unit A and a second application B1 in a second computer unit B, where the first application is a Windows® application.

Figure 2:
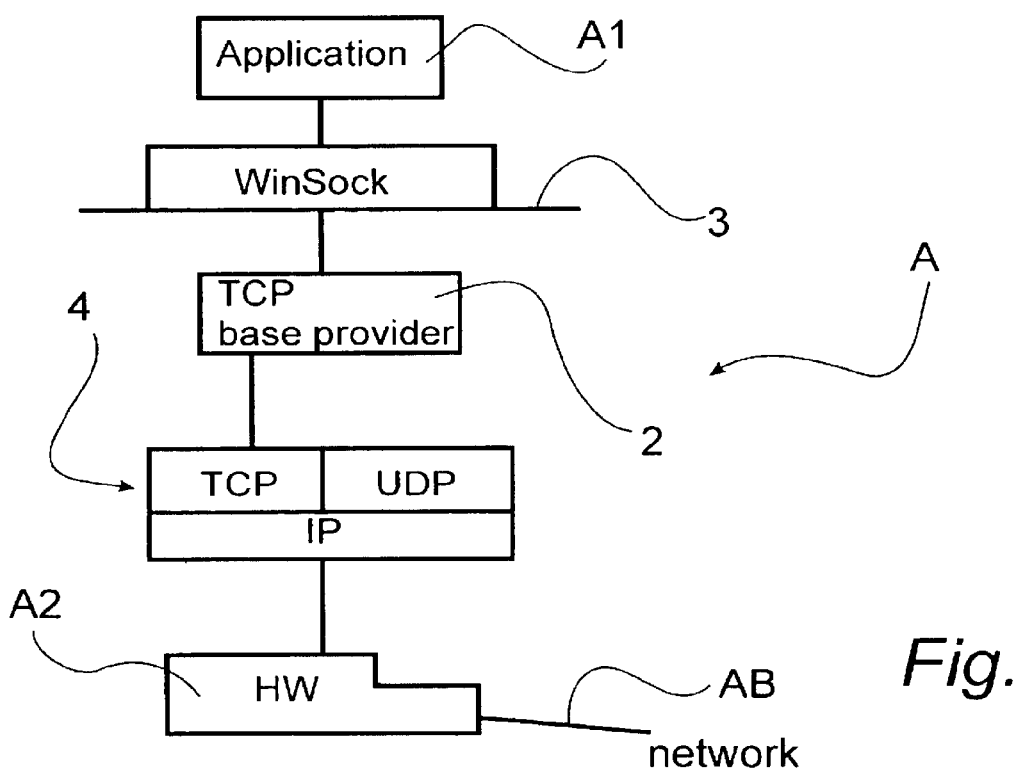
FIG. 2 is a schematic illustration of various functions in a computer unit.

FIG. 2 is a schematic illustration showing that the first computer unit A includes a WinSock TCP base provider 2 operating beneath WinSock SPI 3, and a TCP/UDP/IP stack 4 operating beneath the WinSock TCP base provider 2. FIG. 2 also shows the hardware component A2 that constitutes the physical connection between the network C and the first computer unit A.

The first application A1 includes the function of communicating by means of TCP/IP via the TCP/UDP/IP stack 4 and the WinSock TCP base provider 2. This is effected through the medium of a connection that passes from the application Al to the physical output AB via the WinSock SPI 3, the TCP base provider 2, the TCP/UDP/IP stack 4 and the component A2. This is how different functions of a computer unit that operates with a Windows®-based operating system are constructed in relation to each other.

It is particularly proposed in accordance with the present invention that the first computer unit A includes a module 5 and a WAP stack 6. This module is allocated the function of forming an interface between the WAP stack 6 and the first application, as shown in FIG. 3.

According to the present invention, the module 5 shall operate between the WinSock SPI 3 and the WinSock TCP base provider 2.

Figure 3:
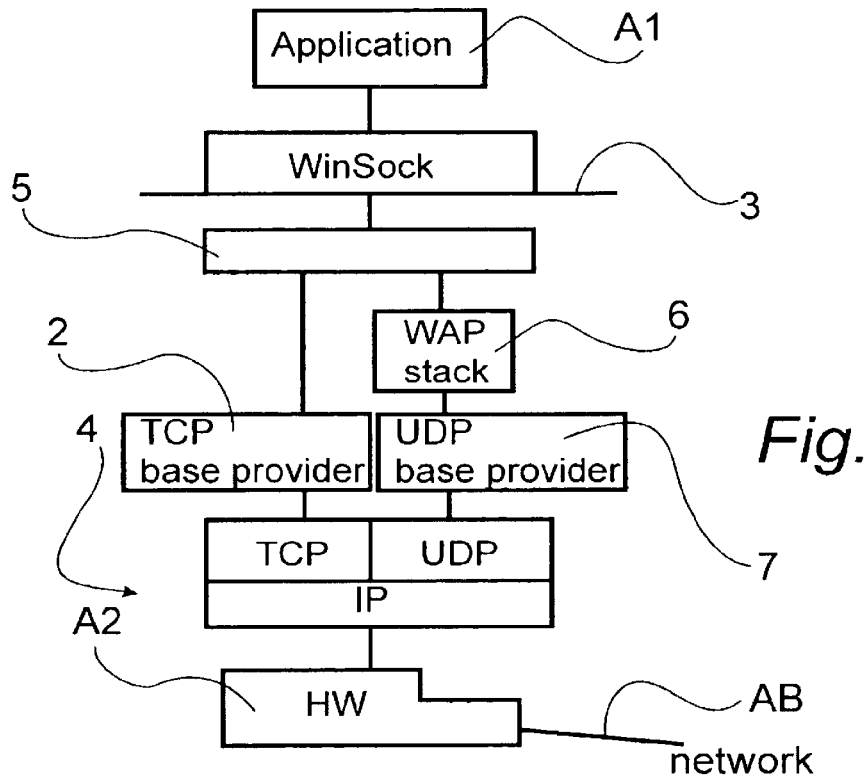
FIG. 3 illustrates schematically how an inventive module can be included in a computer unit in accordance with a first embodiment.

FIG. 3 shows a specific embodiment in which the first computer A includes a WinSock UDP base provider 7 operating beneath the WinSock SPI 3 and parallel with the WinSock TCP base provider 2. The Figure also shows that the TCP/UDP/IP stack 4 also operates beneath the WinSock UDP base provider 7. It is known that the UDP base provider 7 is found and operates in this way in a Windows®-based operating system.

According to this embodiment, the WAP stack 6 operates between the module and the WinSock UDP base provider 7.

In this embodiment, a connection is established between the first application A1 and the second application B1 via the TCP/UDP/IP stack 4, the WinSock UDP base provider 7, the WAP stack 6, and the module 5.

Figure 4:
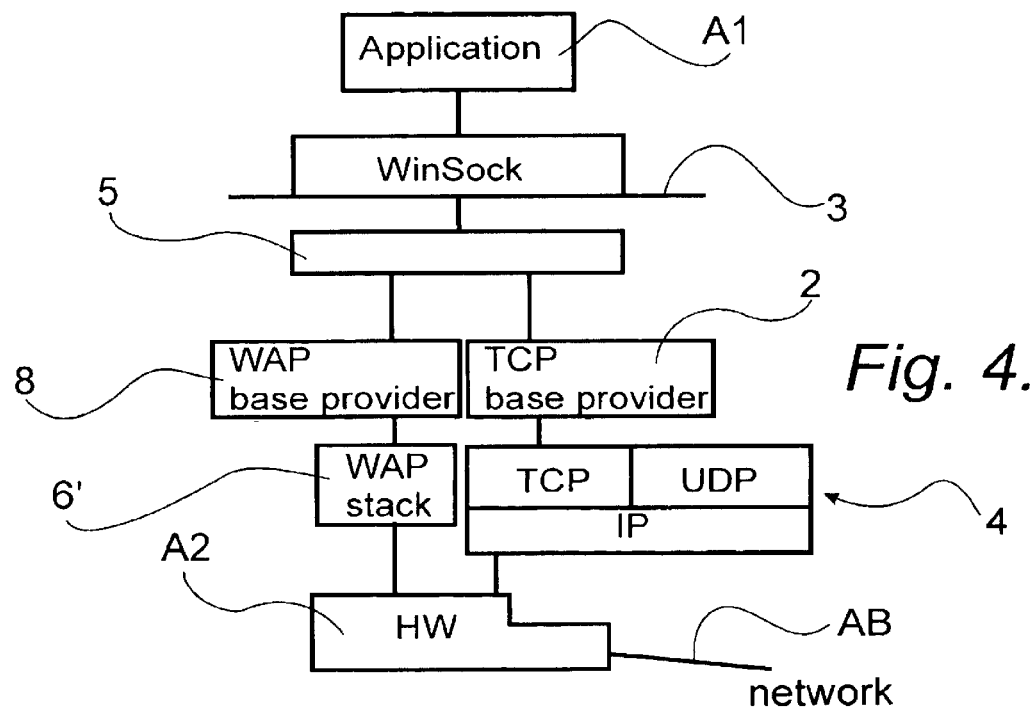
FIG. 4 illustrates schematically how an inventive module can be included in a computer unit in accordance with a second embodiment.

FIG. 4 illustrates an alternative embodiment in which the first computer unit includes a WinSock base provider for WAP 8 operating beneath the module parallel with the WinSock TCP base provider 2. According to this embodiment, the WAP stack 6' operates beneath the WinSock base provider for WAP 8 parallel with the TCP/UDP/IP stack 4 directly with the component A2.

According to this embodiment, a connection is established between the first application A1 and the second application B1 via the WAP stack 6', the WinSock base provider for WAP 8, and the module 5.

In accordance with the present invention, the module 5 translates between a WAP protocol and one or more protocols belonging to one or more different first applications, it maps incoming or outgoing WAP requests or WAP sessions to TCP sockets, and it is transparent to applications that do not communicate in accordance with WAP.

Figure 5:
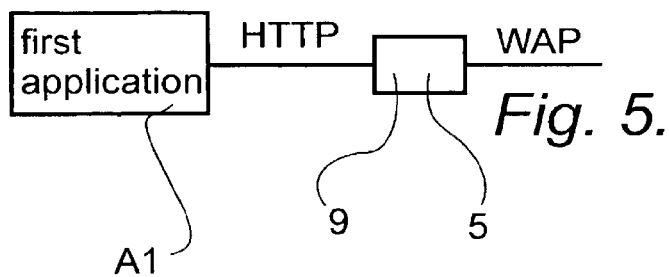
FIG. 5 illustrates schematically that a module can translate between HTTP and WAP.

FIG. 5 is intended to illustrate that when the first application A1 operates in accordance with HTTP, the module 5 translates between WAP and HTTP in accordance with prescribed, standard specifications 9. The Figure illustrates schematically that these specifications are included by the module 5, although it shall be understood that said specifications 9 can be stored physically somewhere else and made accessible to the module 5 when necessary.

This also enables the first application A1 to operate in accordance with SOAP.

Figure 6:
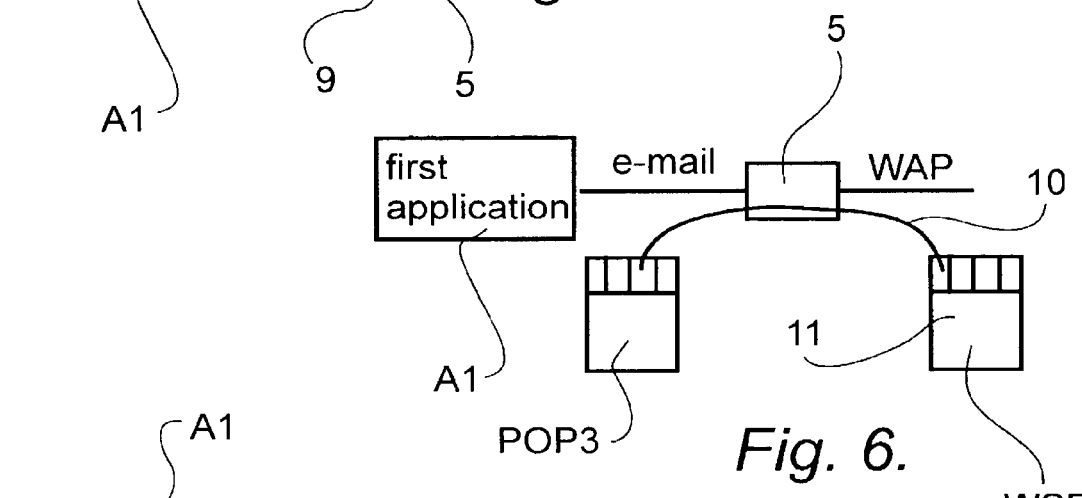
FIG. 6 illustrates schematically how a module handles e-mail messages.

FIG. 6 illustrates schematically a further example where the first application A1 operates in accordance with an e-mail protocol, such as POP3, IMAP4 or SMTP, shown in the Figure as POP3. In this case, it is proposed in accordance with the invention that the module 5 performs mapping 10 of each command and response to one or more of the fields in a WSP message 11.

Figure 7:
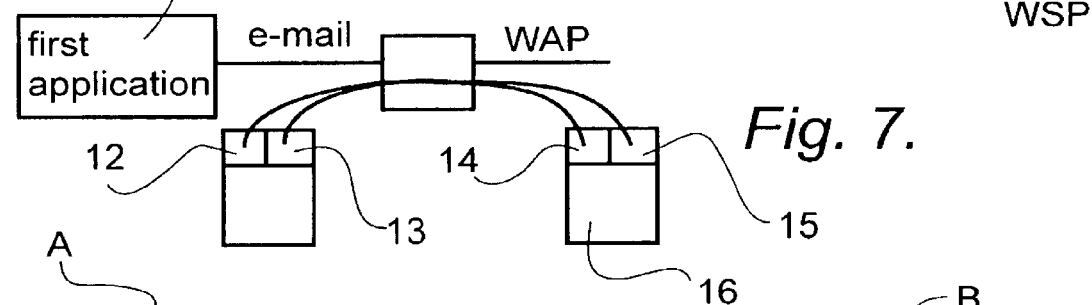
FIG. 7 illustrates schematically how a module handles messages that are authenticated by means of a user name and password.

FIG. 7 illustrates schematically that the first application A1 uses authentication through a user name 12 and password 13. In this case, it is proposed in accordance with the invention that the module 5 reads and writes the user name and password respectively from and into header fields 14, 15 of concerned messages 16 in accordance with WSP.

A module 5 may also decide whether or not a socket shall communicate in accordance with WAP or in accordance with TCP/IP. This can be achieved in a number of different ways.

Figure 8:
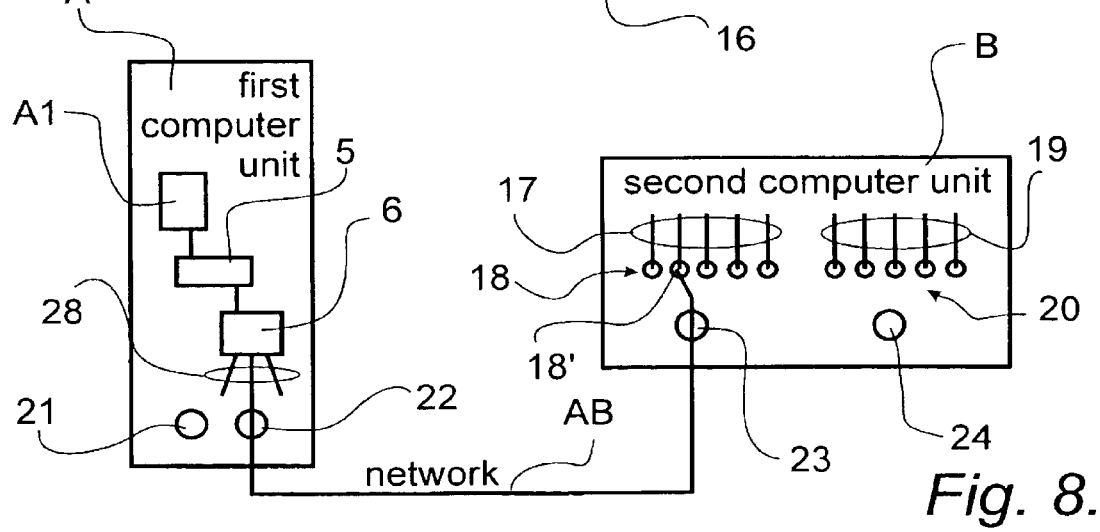
FIG. 8 illustrates schematically how a second computer unit subdivides used ports and IP addresses into ports and IP addresses that communicate according to WAP and ports that do not communicate according to WAP.

FIG. 8 illustrates schematically that a first socket 17 is established against one or more first ports 18 in the second computer unit B, and that second sockets 19 are established against one or more second ports 20 belonging to the second computer unit and separate from the first ports 18. According to the present invention, the module 5 can then chose to communicate in accordance with WAP or in accordance with TCP/IP on the basis of the port 18' used. For instance, if the first ports 18 are used for WAP while the second ports 20 are used for some other communication, the module 5 will know that if the ports 18' belonging to the first ports 18 are used, then communication according to WAP shall be applied.

It is known that a computer unit can be allocated a number of different IP addresses and that one and the same computer unit can therewith be addressed with different IP addresses. According to the present invention, the first or the second computer unit A, B can be allocated a number of different IP addresses 21, 22, 23, 24. In the Figure, the IP address 22 for the first computer unit and the IP address 23 for the second computer unit have been selected for receiving WAP requests or sessions. This enables the module 5 to elect to communicate according to WAP or according to TCP/IP on the basis of the IP address used.

As will be apparent from FIG. 9, a first computer unit A' can, in certain cases, be connected to the network via a first device 25 having a first bandwidth 25b, such as via a GSM telephone. In other cases, a first computer unit A" may be connected to the network C via a second device 26 having a second bandwidth 25b, such as via a modem and a fixed telephone line. The first bandwidth 25b is, in this case, lower than the second bandwidth 26b.

According to the present invention, the module 5', 5" active in the first computer unit A', A" reads the available bandwidth and then chooses to communicate in accordance with WAP when the available bandwidth is equal to or lower than the first bandwidth 25b, and chooses to communicate in accordance with TCP/IP when the available bandwidth is higher than the first bandwidth 25b.

It is possible for a plurality of parallel ongoing applications to communicate simultaneously from the first computer unit, and also for several of these applications to constitute first applications, in other words that said applications communicate in accordance with WAP. It is also proposed in accordance with the invention that said module carries out a check that enables the module to decide to which first application an incoming WAP request or session belongs.

According to FIG. 10, this check may consist of the detection in a header belonging to an incoming message 27 of a predetermined field 27' that identifies the first application A1' concerned from among a number of possible first applications A1, A1', A".

Referring back to FIG. 8, it will be seen that the WAP stack 6 is used on several ports 28 and that these ports are used to ascertain the first application A1 to which an incoming WAP request or session belongs.

An application is addressed through a URI, which may have the following appearance, for instance: http://wap.columbitech.com:803/start.xml?name=x This URI consists of a number of different fields of which the first is a protocol-identifying field which contains 'http'in the illustrated case, the second field is a host-identifying field which contains'wap.columbitech.com' in this case, the third field is a port-identifying field which contains'803' in this case, the fourth field is a pathidentifying field which contains '/start.wml' in this case, and the fifth field is a parameter field which contains 'name=x' in the illustrated case.

According to the present invention, the module 5 can also identify the first application to which a given incoming request or session belongs, by identifying a unique field of a URI belonging to the request or session, such as the protocol-identifying field, the host-identifying field, the port-identifying field, the path-identifying field, and/or a parameter field.

Different applications can use different WSP methods and certain such methods are unique for certain applications. According to the present invention, the check which ascertains to which first application an incoming WAP request or session belongs may consist in the detection of a predetermined WSP method used by the incoming request or session and the determination of which WSP method is unique to the first application that uses this WSP method.

The first application may also be identified by the TCP port or ports on which it listens, in other words the incoming request or session addresses a given TCP port and therewith also identifies the first application concerned.

It is known that applications which use TCP sockets deliver a partial-response to a request, whereas an application that communicates in accordance with WAP requires a complete response. Accordingly, it is proposed in accordance with the invention, as shown in FIG. 11, that the module 5 stores partial-responses 29 from the first application A1 until a response 30 is complete, and then sends this complete response 31 to the second application B1.

In order to readily implement an inventive module, it is proposed in accordance with the invention that the module is comprised of a WinSock LSP.

An inventive module enables communication between different types of computer units in the network C.

Figure 12:
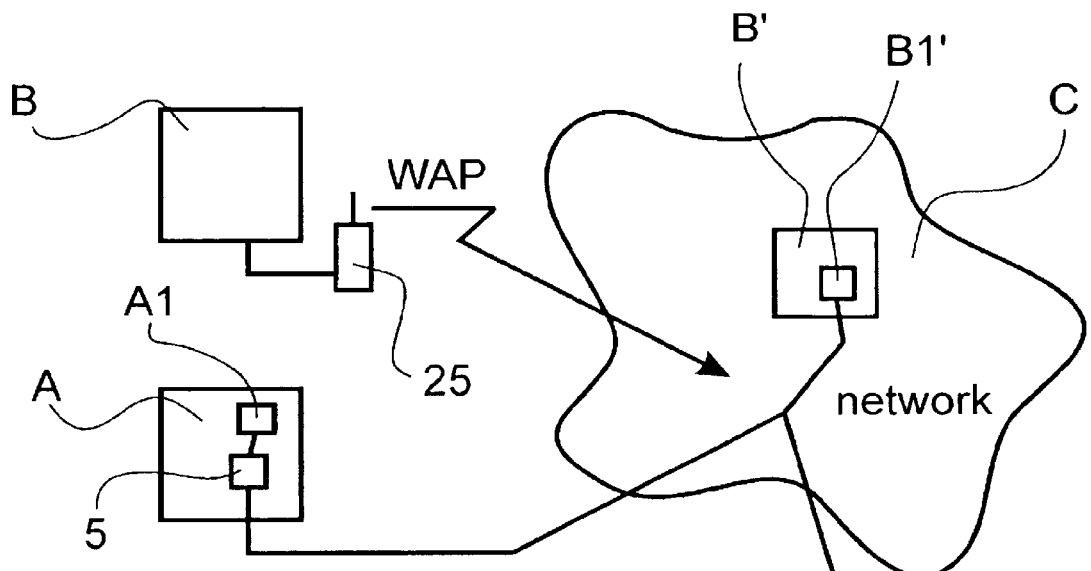
FIG. 12 illustrates schematically examples of different types of second computer units that can communicate with a first computer unit.

FIG. 12 shows that the second computer unit B may be comprised of a computer unit adapted for communication by means of WAP, such as a WAP telephone or a computer unit connected to said network via a wireless telephone.

The second computer unit B' may consist of a computer unit that includes a second application B1' comprised of a WAP gateway or a WAP server.

The second computer unit B" may comprise a computer unit that has the same properties as the first computer unit A. the second computer unit B" may also include an inventive module 5" and a WAP stack 6".

In this case, the second application B1" may also be comprised of a Windows® application, and the first computer unit A may communicate with the second computer unit B" by means of WAP.

Although the present invention can be applied on different networks, it is probably most suitablly applied in those cases where the network C is comprised either completely or partially of the global network Internet.

Figure 13:
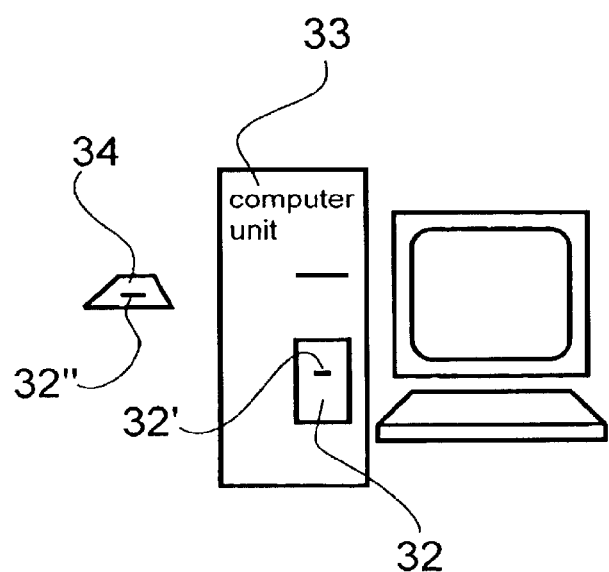
FIG. 13 illustrates schematically a computer program product and a computer readable medium according to the present invention.

FIG. 13 is intended to show that the present invention also includes a computer program product 32 that includes a computer program code 32' which, when executed by a computer unit 33, carries out the functions possessed by an inventive module 5, a WAP stack 6, and, when appropriate, a WinSock base provider for WAP 8.

The present invention also relates to a computer readable medium 34, shown in FIG. 13 in the form of a diskette, on which there can be stored a computer program code 32" which, when executed by a computer unit 33, carries out the functions possessed by an inventive module 5, a WAP stack 6, and, when appropriate, a WinSock base provider for WAP 8.

It will be understood that the invention is not restricted to the aforedescribed and illustrated exemplifying embodiments thereof, and that these embodiments can be modified within the scope of the inventive concept illustrated in the accompanying Claims.

What is claimed is:

1. A method of establishing via a network a communication by means of WAP protocols between a first application in a first computer unit and a second application in a second computer unit, wherein said first application is comprised of a Windows® application, wherein said first computer unit includes a WinSock TCP base provider operating beneath WinSock SPI, and a TCP/UDP/IP stack operating beneath said WinSock TCP base provider, wherein said first application includes the function of communicating by means of TCP/IP via said TCP/UDP/IP stack and said WinSock TCP base provider, and wherein the method is characterised in that said first computer unit includes a module and a WAP stack; and in that said module is allocated the function of forming an interface between said WAP stack and said first application.

2. A method according to claim 1, characterised in that said module operates between WinSock SPI and said WinSock TCP base provider.

3. A method according to claim 2, characterised in that said first computer unit includes a WinSock UDP base provider operating beneath said WinSock SPI and parallel with said WinSock TCP base provider; in that said TCP/UDP/IP stack also operates beneath said WinSock UDP base provider; and in that said WAP stack operates between said module and said WinSock UDP base provider.

4. A method according to claim 3, characterised by establishing a connection between said first application and said second application via said TCP/UDP/IP stack, said WinSock UDP base provider, said WAP stack and said module.

5. A method according to claim 2, characterised in that said first computer unit includes a WinSock base provider for WAP operating beneath said module parallel with said WinSock TCP base provider; and in that said WAP stack operates beneath said WinSock base provider for WAP, parallel with said TCP/UDP/IP stack.

6. A method according to claim 5, characterised by establishing a connection between said first application and said second application via said WAP stack, said WinSock base provider for WAP, and said module.

7. A method according to claim 1, characterised in that said module translates between a WAP protocol and one or more protocol belonging to one or more different first applications; in that said module maps incoming or outgoing WAP requests or WAP sessions to TCP sockets; and in that said module is transparent for applications that do not communicate in accordance with WAP.

8. A method according to claim 7, characterised in that when said first application operates according to HTTP, said module translates between WAP and HTTP in accordance with determined standardised specifications.

9. A method according to claim 8, characterised in that said first application operates according to SOAP.

10. A method according to claim 7, characterised in that when said first application operates in accordance with an e-mail protocol, such as POP3, IMAP4 or SMTP, said module performs mapping of each command and response on one or some fields in a WSP message.

11. A method according to claim 7, characterised in that when said first application uses authentication through a user name and password, said module respectively reads and writes the user name and password from and into a header field of the WSP message.

12. A method according to claim 1, characterised in that said module can determine whether a socket shall communicate in accordance with WAP or in accordance with TCP/IP.

13. A method according to claim 12, characterised by establishing first sockets to one or more first ports in said second computer unit, establishing sockets to one or more second ports belonging to said second computer unit and being different from said first ports; and causing said module to communicate according to WAP or according to TCP/IP on the basis of the port used.

14. A method according to claim 12, characterised by allocating to said first or said second computer unit a number of different IP addresses; selecting one or more of said IP addresses to receive WAP requests or sessions; and causing said module to communicate according to WAP or according to TCP/IP on the basis of the IP address used.

15. A method according to claim 12, characterised in that said first computer unit is connected to said network in certain cases via a first device that has a first bandwidth, such as via a GSM telephone, and, in other cases, is connected to said network via a second device having a second bandwidth, such as via a modem and a fixed telephone line, wherein said first bandwidth is lower than said second bandwidth; in that said module reads the available bandwidth; in that communication according to WAP is used when the available bandwidth is equal to or lower than said first bandwidth; and in that communication according to TCP/IP is used when the available bandwidth is higher than said first bandwidth.

16. A method according to claim 1, characterised in that said module performs a check which enables said module to ascertain to which first application an incoming WAP request or session belongs.

17. A method according to claim 16, characterised in that said check comprises the detection of a predetermined field in a header belonging to an incoming message.

18. A method according to claim 16, characterised by using said WAP stack on a number of ports, and by using said ports to carry out said check.

19. A method according to claim 16, characterised by addressing an application through an URI, and identifying the first application to which a given incoming request or session belongs by identifying a unique field of a URI belonging to said request or session, such as the protocol-identifying field, the host-identifying field, the port-identifying field, the path-identifying field and/or a parameter field.

20. A method according to claim 16, characterised in that said check consists in detecting a predetermined WSP method used by said request or session and being unique to the first application that uses said WSP method.

21. A method according to claim 16, characterised in that said first applications are identified by the TCP port or ports on which they listen.

22. A method according to claim 1, characterised in that when said first application uses TCP sockets, said module stores partial-responses from said first application until a complete response is obtained and then sends this complete response to said second application.

23. A method according to claim 1, characterised in that said module is a WinSock Layered Service Provider.

24. A method according to claim 1, characterised in that said second computer unit is a computer unit that is adapted for WAP communication, such as a WAP telephone or a computer unit connected to said network via a wireless telephone.

25. A method according to claim 1, characterised in that said second application is comprised of a WAP gateway or a WAP server.

26. A method according to claim 1, characterised in that said second computer unit is comprised of a computer unit that has the same properties as said first computer unit; in that said second application is comprised of a Windows® application; and in that said first computer unit communicates with said second computer unit by means of WAP.

27. A method according to claim 1, characterised in that said network is the global network Internet.

28. A computer program product, characterised in that said product includes a computer program code which, when executed by a computer unit, performs the functions possessed by a module, a WAP stack and, when appropriate, a WinSock base provider for WAP, in accordance with claim 1.

29. A computer readable medium, characterised in that said medium has stored thereon a computer program code which, when executed by a computer unit, performs the functions possessed by a module, a WAP stack, and, when appropriate, a WinSock base provider for WAP, in accordance with claim 1.

* * * * *